US008062114B2

(12) United States Patent
Bennett

(10) Patent No.: US 8,062,114 B2
(45) Date of Patent: Nov. 22, 2011

(54) GAMING SYSTEM AND A GAMING METHOD

(75) Inventor: Nicholas Luke Bennett, Manly Vale (AU)

(73) Assignee: Aristocrat Technologies Australia Pty Ltd. (AU)

( * ) Notice: Subject to any disclaimer, the term of this patent is extended or adjusted under 35 U.S.C. 154(b) by 1065 days.

(21) Appl. No.: 11/781,720

(22) Filed: Jul. 23, 2007

(65) Prior Publication Data

US 2008/0064463 A1 Mar. 13, 2008

(30) Foreign Application Priority Data

Jul. 24, 2006 (AU) ................................ 2006903979

(51) Int. Cl.
*A63F 13/00* (2006.01)

(52) U.S. Cl. .................. 463/16; 463/1; 463/25; 463/42; 709/223; 273/139

(58) Field of Classification Search .................... 463/15, 463/16, 25, 42, 1; 273/139; 709/223
See application file for complete search history.

(56) References Cited

U.S. PATENT DOCUMENTS

| | | | | |
|---|---|---|---|---|
| 7,052,011 B2 * | 5/2006 | Pierce et al. | .................. | 273/139 |
| 7,070,501 B2 * | 7/2006 | Cormack et al. | ................ | 463/16 |
| 2004/0219961 A1 * | 11/2004 | Ellenby et al. | .................... | 463/1 |
| 2006/0084487 A1 * | 4/2006 | Pierce et al. | ..................... | 463/16 |
| 2007/0259709 A1 * | 11/2007 | Kelly et al. | ...................... | 463/20 |
| 2008/0254893 A1 * | 10/2008 | Patel et al. | ....................... | 463/42 |
| 2009/0197672 A1 * | 8/2009 | Kelly et al. | ..................... | 463/25 |

* cited by examiner

*Primary Examiner* — Pierre Eddy Elisca
*Assistant Examiner* — Shahid Kamal
(74) *Attorney, Agent, or Firm* — McAndrews, Held & Malloy, Ltd.

(57) ABSTRACT

A gaming system with a free play mode. The gaming system has a game controller configured to process game play instructions in accordance with game rules to produce game outcomes. A credit meter is under the control of the game controller, the credit meter incremented or decremented in accordance with the game outcomes during normal play. A player interface is in data communication with the game controller. The player interface comprising a display that displays game outcomes to the player and operable to cause a free mode instruction to be communicated to the game controller. The game controller is configured to deactivate the credit meter in response to receipt of a free mode instruction.

14 Claims, 4 Drawing Sheets

GAMING SYSTEM AND A GAMING METHOD

CROSS REFERENCE TO RELATED APPLICATIONS

This application claims priority to Australian Patent Application No. AU2006903979, having an international filing date of Jul. 24, 2006, entitled "A Gaming System and a Gaming Method", which is hereby incorporated by reference herein in its entirety.

FIELD OF THE INVENTION

Certain embodiments of the present invention relate to a gaming system as well as to a gaming method.

BACKGROUND TO THE INVENTION

Gaming machines currently require a player to pay for credits in order to enter and play the game. This means that even when a player is learning to play a game, they must purchase credit. This can be a barrier to take up of the game as a player may feel that they will need to invest a considerable number of credits in order to learn how to play the game properly.

SUMMARY OF THE INVENTION

Certain embodiments of the present invention broadly relate to a gaming system with a free play mode comprising:

a game controller configured to process game play instructions in accordance with game rules to produce game outcomes;

a credit meter under the control of the game controller, the credit meter incremented or decremented in accordance with the game outcomes during normal play; and a player interface in data communication with the game controller the player interface comprising a display that displays game outcomes to the player and operable to cause a free mode instruction to be communicated to the game controller, and wherein the game controller is configured to deactivate the credit meter in response to receipt of a free mode instruction.

In an embodiment, the player interface comprises a free mode selector operable by the player to enter a free mode instruction.

In an embodiment, the game controller is configured to reactivate the credit meter in response to receipt of an end free mode instruction.

In an embodiment the free mode selector is operable to cause an end free mode instruction to be communicated to the game controller.

In an embodiment, the player interface comprises at least one credit input mechanism and the credit input mechanism is deactivated by the game controller in response to receipt of a free mode instruction.

In an embodiment, the player interface comprises at least one credit output mechanism and the credit output mechanism is deactivated by the game controller in response to receipt of a free mode instruction.

In an embodiment, the game controller comprises at least one regulatory meter configured to record data related to normal game play and free mode game play and the game controller is configured to control the regulatory meter to record data related to normal game play or free mode game play based on whether a player is engaging in normal game play or free mode game play.

In an embodiment the gaming system further comprises a player tracking device reader and a free mode selection instruction is automatically generated when specified by free mode data stored in a player tracking device provided to the player tracking device.

In an embodiment the gaming system further comprises a ticket reader and a free mode selection instruction is automatically generated when a ticket encoding free mode data encoded is provided to the player tracking device.

In an embodiment the game controller may only respond to the free mode or end free mode instructions if one or more conditions is met. For example, a condition may be that the player is playing a part of the game where free mode can be activated or deactivated.

In an embodiment the gaming system is constituted by a gaming machine.

Certain embodiments of the present invention also broadly relate to a method of gaming comprising deactivating a credit meter of a gaming system in response to a game controller receiving a free mode instruction.

Certain embodiments of the present invention also broadly relate to computer program code which when executed implements the above method.

The computer program code may be embodied on a computer readable medium.

BRIEF DESCRIPTION OF THE DRAWINGS

Notwithstanding any other embodiments that may fall within the scope of the present invention, certain embodiments of the present invention will now be described, by way of example only, with reference to the accompanying figures, in which.

DETAILED DESCRIPTION OF CERTAIN EMBODIMENTS

Figure 1:
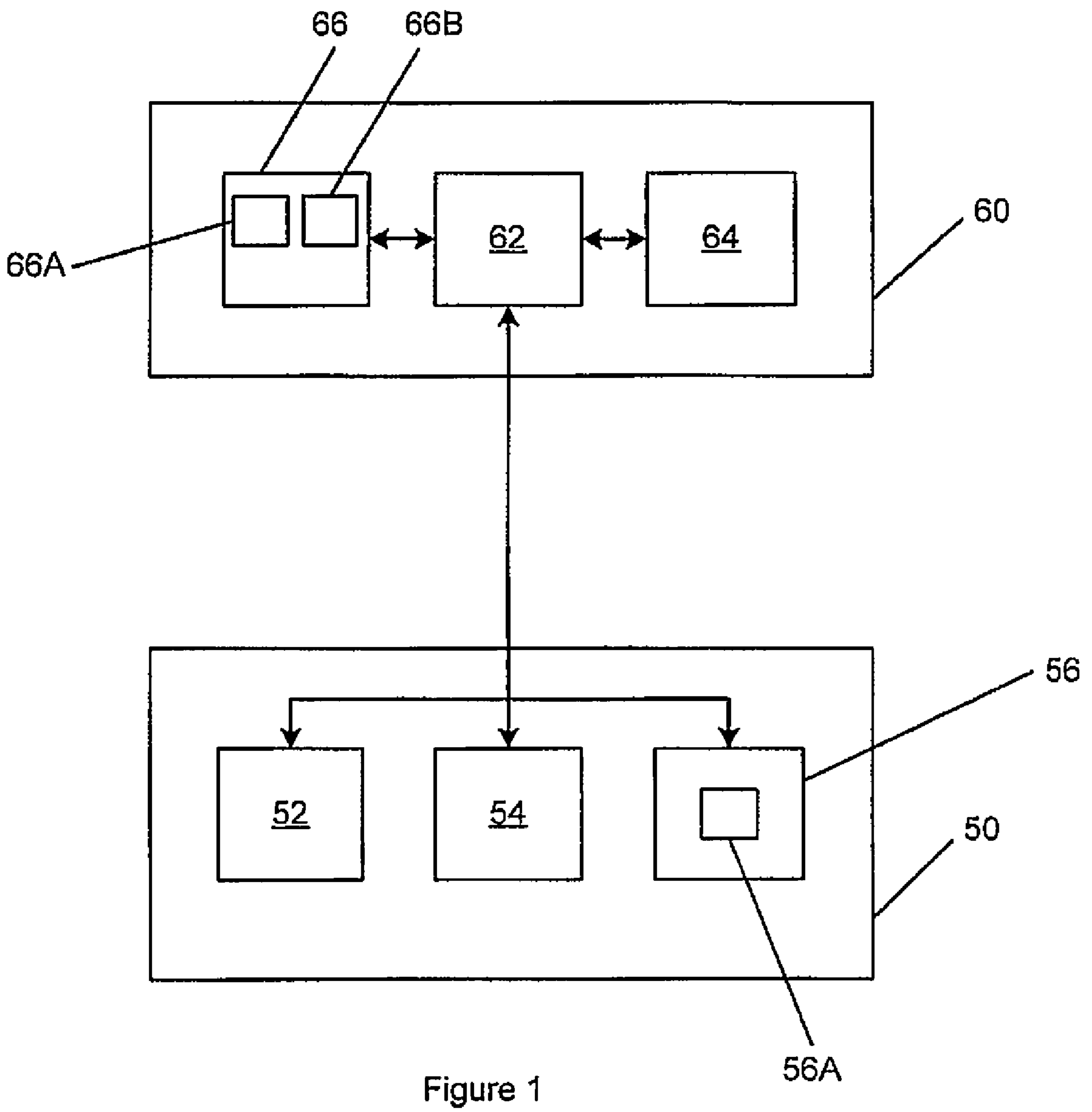
FIG. 1 is a schematic diagram of a gaming system.

Referring to the drawings, there are shown gaming systems for implementing a free play mode. Each gaming system is configured such that a free play mode can be initiated by receiving a free mode instruction from the player interface. In an embodiment, a free play selector is manually operable by a player to input a free mode instruction. In another embodiment, a free mode instruction can be generated automatically in response to the player providing a playing tracking device to the gaming system or inputting a ticket to a ticket reader that has free game data thereon. Activation of the free play mode causes the game controller to deactivate the credit meter of the gaming system. The player can then play the game as normal, i.e. play an "honest" game, but the credit meter is not incremented or decremented. In an embodiment, a regulatory meter is switched from a normal mode to a free game mode.

A gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

In certain embodiments, irrespective of the form, the gaming system comprises several core components. At the broadest level, the core components are a player interface 50 and a game controller 60 as illustrated in FIG. 1. The player interface 50 is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions. In one embodiment, the game play mechanism 56 incorporates a free mode selector 56A operable by the player to select free play mode. Operation of the free mode selector 56A causes a free mode instruction to be sent to the game controller 60.

The game controller 60 is in data communication with the player interface 50 and typically includes a processor 62 that processes the game play instruction received from the player interface in accordance with game play rules and outputs game play outcomes to the display 54. Typically, the game play rules are stored as program code in a memory 64 but can also be hardwired.

Herein the term "processor" is used to refer generically to any device that can process game play instructions in accordance with game play rules and may include: a microprocessor, microcontroller, programmable logic device or other computational device, a general purpose computer (e.g. a PC) or a server. The gaming system also has meters 66 including a credit meter 66A and one or more regulatory compliance meters 66B. In response to receipt of a free mode instruction, processor 62 of game controller 60 deactivates credit meter 66. Processor 62 also controls the regulatory meter 66B to record data indicative that the game is in free play mode. Further operation of the free game selector 56A by the player sends an end free mode instruction to the processor which reactivates the credit meter 66A and controls regulatory meter 66B to record that the game is in normal play mode.

Figure 2:
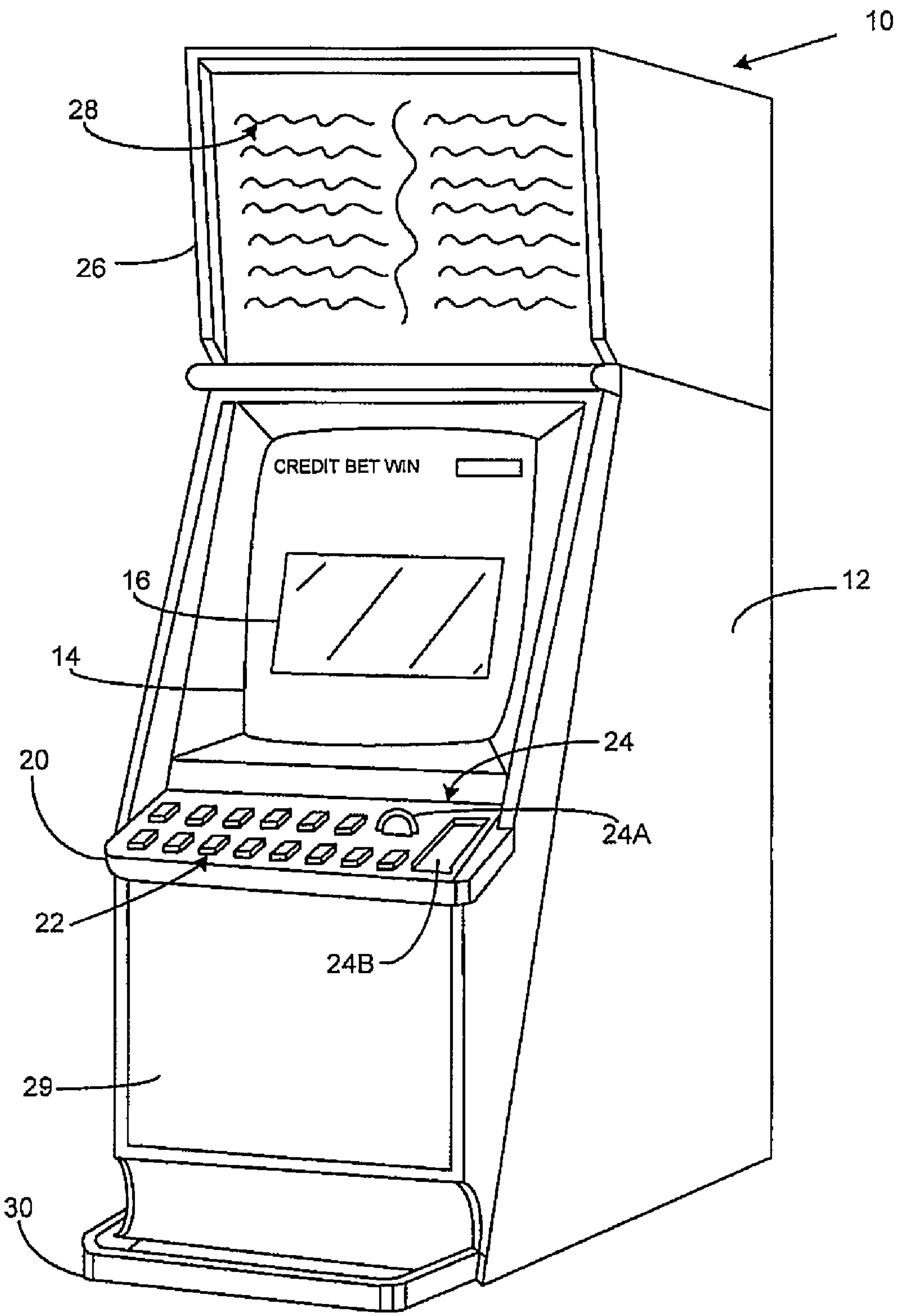
FIG. 2 is a perspective view of a gaming system in the form of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Further, the gaming machine may comprise a ticket reader and a ticket printer for respectively receiving or printing tickets. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
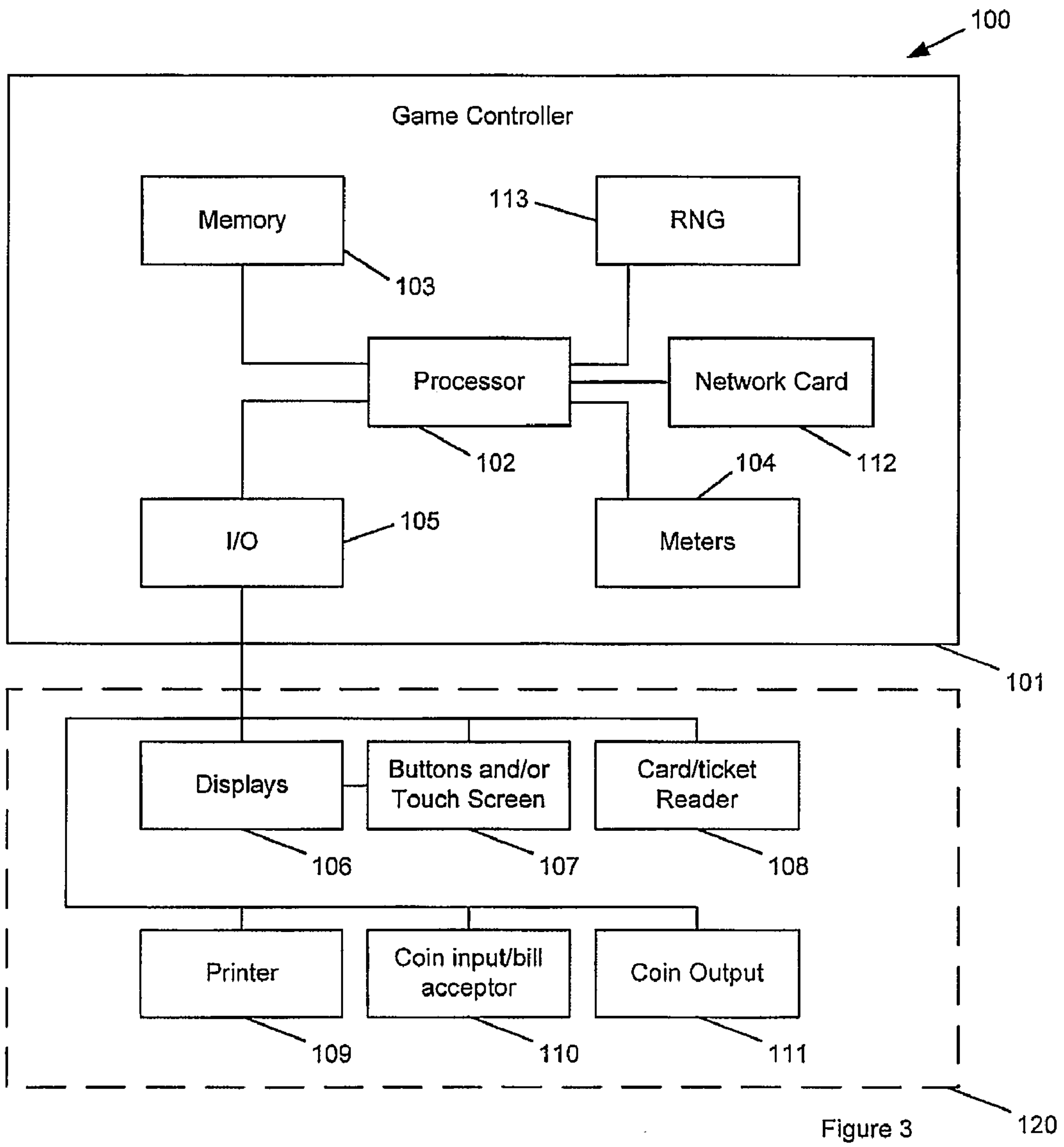
FIG. 3 is a schematic diagram of a gaming system.

FIG. 3 shows a block diagram of operative components of the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102 in the generation of game outcomes.

In the example shown in FIG. 3, a player interface 120 includes peripheral devices that communicate with the game controller 101 comprise one or more displays 106, buttons and/or a touch screen 107, a card and/or ticket reader 108, a printer 109, a bill acceptor and/or coin input mechanism 110 and a coin output mechanism 111. Additional hardware may be included as part of the gaming machine 100, or hardware may be omitted for a specific implementation.

In one embodiment, the player inputs a free mode instruction by operating a free mode selector in the form of a button 107 and/or a relevant portion of the touch screen 107 depending on the particular configuration of the gaming machine. This sends a free mode instruction via input/output interface 105 to processor 102. Processor 102 processes the free mode instruction in accordance with instructions contained in memory 103. Processor 102 then deactivates the credit meter which is one of the meters 104.

Meters 104 also include a regulatory meter which is configured to record data related to normal game play and free mode game play. In response to receipt of a free game play mode instructions, processor 102 instructs regulatory meter to record data in free play mode.

Once free mode has been entered into, the processor sends data to the display 106 of the user interface 120 to display a message to the effect that free mode has started. Typically this is done in a manner such that the message persists and the player can readily see that they are in free play mode. For example, the area of the display that normally displays a credit meter is modified to indicate “Free play mode active”. Alternatively, where the free mode selector is a button, the button is lit to indicate that the mode is active. As the credit meter is deactivated, it can no longer increment or decrement. The processor 102 also switches off the coin input and output mechanisms 110, 111.

The player is then able to play the game in accordance with the normal game rules of the game without the credit meter being altered, although it is possible in some embodiments for the game rules to be modified during free play. The processor 102 processes instructions input by buttons and/or touch screen 107 and determines whether a win occurs in accordance with the game rules of the game being played. If the processor 102 determines that a prize should be awarded, processor 102 causes the player interface 120 to display this on display 106 to the player however the credit meter 104 is not incremented. Accordingly, the player can observe whether they have obtained a win as a result of the game play.

When the player wishes to return to credit play, the player presses the free play button and/or the free play icon on the touch screen 107 which causes an end free play instruction to be sent to processor 102. Processor 102 processes the end free play instruction and reactivates credit meter 104 and causes the regulatory meters to return to normal credit mode.

Persons skilled in the art will appreciate that free play mode may also be ended in a number of other ways. For example, a limit in terms of time or number of games may be imposed. Alternatively, the gaming machine may need to be shut down for some reason. In order that a player can redeem their credits, it is envisaged that the game machine would return to normal mode in such circumstances.

In an alternative embodiment, a free play instruction may be input in response to a player providing a player tracking device to the gaming machine. This may be provided as an addition to the manually operable free mode selector described above or as an alternative. When a player tracking device is read by reader 108, the reader 108 passes data obtained from the player tracking device to the processor 102. If the data includes free play data, the processor 102 processes the free play data in accordance with instructions contained in memory 103, deactivates the credit meter 104 and modifies the regulatory meters 104 as described above. Thus, code in memory 103 and the processor may provide a free play module. Thus, in this embodiment, the data in the player tacking device constitutes a free play instruction communicated to the gaming machine. In an alternative, the player tracking device may be read and processed by a player marketing module or similar, which communicates data specifying free play to the gaming machine.

The free play data may be incorporated in the tracking device for a number of reasons. For example, the player may have been awarded free play on a previous occasion or be based on a user preference stored as data in the tracking device.

In a further embodiment, the gaming machine may be adapted to receive tickets via ticket reader which contain data specifying that the player is entitled to free play and hence receive data constituting a free play instruction from the ticket reader 108.

It will be appreciated in relation to the above, that the player need not necessarily have credit in order for the credit meter to be deactivated.

In a variation of the above embodiment, which may be used in addition to the above embodiments or as alternative, the game controller is arranged to periodically deactivate the credit meter and put the machine into “attract” mode which shows the player each of the features available in the machine.

In addition, the gaming machine 100 may include a communications interface, for example a network card 112. The network card may, for example, send status information, accounting information or other information to a central controller, server or database and receive data or commands from the central controller, server or database.

Figure 4:
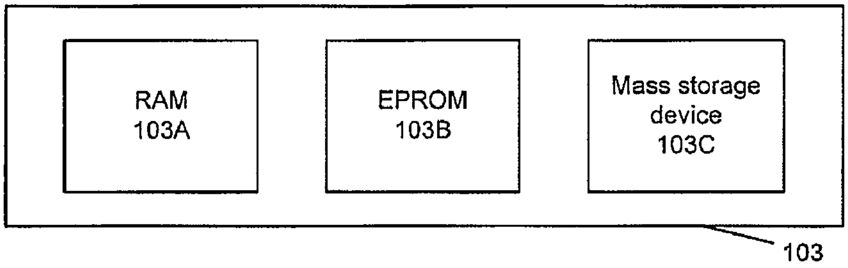
FIG. 4 is a schematic diagram illustrating the memory of FIG. 3.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
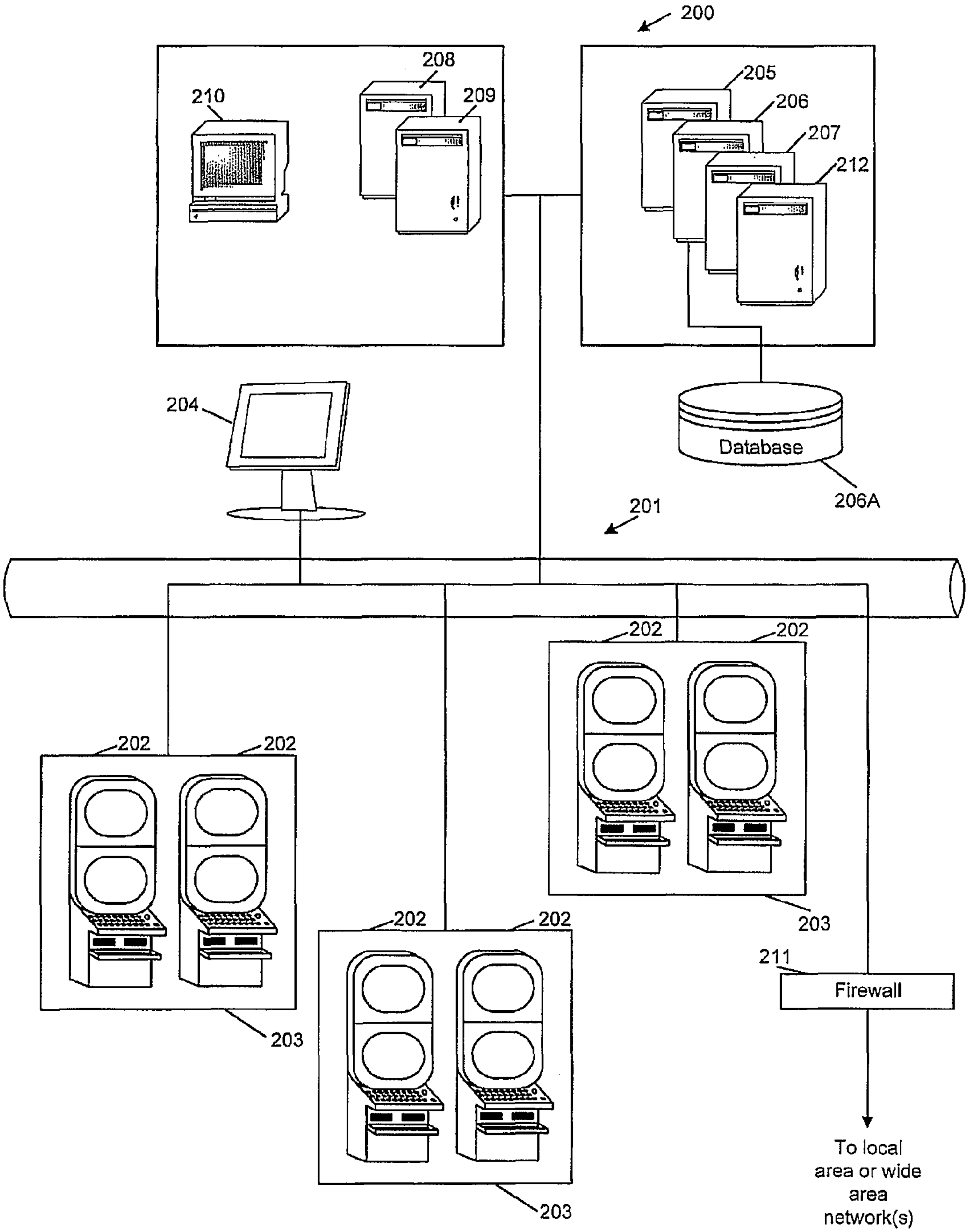
FIG. 5 is a schematic diagram of a gaming system having networked gaming machines.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

Depending on where this aspect of the game is controlled, either the game machine or the game controller may switch off the credit meter.

In a thick client embodiment, game server 205 implements part of the game played by a player using a gaming machine 202 and the gaming machine 202 implements part of the game. As in the above embodiment, the gaming machine provides a player interface incorporating a free mode selector to enable selection of free mode as described above. With this embodiment, as both the game server and the gaming device implement part of the game, they collectively provide a game controller. Depending on the specific implementation, the credit meter and regulatory meter may be located on the gaming machine 202 side, e.g. as hardware meters as indicated in FIG. 2, or on the server side, in which case they are typically provided as modules of program code executed by the server 205. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a thin client embodiment, game server 205 implements most or all of the game played by a player using a gaming machine 202 and the gaming machine 202 essentially provides only the player interface which incorporates a free mode selector which can operate as described above. With this embodiment, the game server 205 provides the game controller. The gaming machine will receive player instructions including free mode or end free mode instruction, pass these to the game server 205 which will process them to enable free mode play and return game play outcomes to the gaming machine for display. In a thin client embodiment, the gaming machines could be computer terminals, e.g. PCs running software that provides a player interface operable using standard computer input and output components. In this embodiment, the credit meter and regulatory meter are provided as program code executed by game server 205.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network. A loyalty system 212 may also be connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games as required by the terminals.

The invention claimed is:

1. A gaming system with a free play mode comprising:

a game controller configured to process game play instructions in accordance with game rules to produce game outcomes;

a credit meter under control of the game controller, wherein the credit meter is activated, under normal game play, to increment an award to a player of the game in response to a winning outcome of the game and to decrement a wager amount provided by the player in response to a losing outcome;

a player interface in data communication with the game controller, wherein the player interface comprises a display that displays game outcomes to the player;

a free mode interface associated with the player interface, wherein the free mode interface initiates communication of a free mode instruction on behalf of the player to the game controller; and wherein the game controller is further configured to deactivate the credit meter in response to receipt of the free mode instruction thereby allowing the player to play the game without entering a wager in the credit meter and inhibiting provision of an award to the player in response to a winning outcome of the game.

2. A gaming system as claimed in claim 1 wherein the player interface comprises a free mode selector operable by the player to enter a free mode instruction.

3. A gaming system as claimed in claim 1 wherein the game controller is configured to reactivate the credit meter in response to at least receipt of an end free mode instruction.

4. A gaming system as claimed in claim 2 wherein the free mode selector is operable to cause an end free mode instruction to be communicated to the game controller.

5. A gaming system as claimed in claim 1 wherein the player interface comprises at least one credit input mechanism, wherein the credit input mechanism is deactivated by the game controller in response to receipt of the free mode instruction.

6. A gaming system as claimed in claim 1 wherein the player interface comprises at least one credit output mechanism, wherein the credit output mechanism is deactivated by the game controller in response to receipt of the free mode instruction.

7. A gaming system as claimed in claim 1 further comprising at least one regulatory meter under control of the game controller, wherein the regulatory meter is configured to record data related to normal game play and data related to free mode game play, wherein the game controller is configured to control the regulatory meter to record data related to normal game play or free mode game play based on whether the player is engaging in normal game play or free mode game play.

8. A gaming system as claimed in claim 1, further comprising a player tracking device reader, wherein the free mode instruction is automatically generated when specified by free mode data stored in a player tracking device provided to the player tracking device reader.

9. A gaming system as claimed in claim 1, further comprising a ticket reader, wherein the free mode instruction is automatically generated when a ticket including encoding free mode data is provided to the player tracking device.

10. A gaming system as claimed in claim 1, wherein the game controller is configured to respond to the free mode instruction or an end free mode instruction only if at least one condition is met.

11. A gaming system as claimed in claim 10 wherein the at least one condition is that the player is at a stage of game play where free mode can be activated or deactivated.

12. A gaming system as claimed in claim 1, wherein the game controller is further configured to periodically deactivate the credit meter and to display at least one feature of the game to the player to assist the player to learn about the game.

13. A gaming machine with a free play mode comprising:

a local memory;

a game controller configured to process game play instructions in accordance with game rules to produce game outcomes as defined by executable code stored in the local memory;

a credit meter under control of the game controller, wherein the credit meter is activated, under normal game play, to increment an award to a player of the game in response to a winning outcome of the game and to decrement a wager amount provided by the player in response to a losing outcome;

a player interface in data communication with the game controller, wherein the player interface comprises a display that displays game outcomes to the player;

a free mode interface associated with the player interface, wherein the free mode interface initiates communication of a free mode instruction on behalf of the player to the game controller for local execution of a free mode game using executable code stored in the local memory; and wherein the game controller is further configured to execute a deactivation routine stored in the local memory to deactivate the credit meter in response to receipt of the free mode instruction thereby allowing the player to play the game without entering a wager in the credit meter and inhibiting provision of an award to the player in response to a winning outcome of the game.

14. A method of operating a gaming machine comprising:

processing game play instructions in a game controller at the gaming machine in accordance with game rules to produce game outcomes;

incrementing, in a credit meter, an award to a player of the game in response to a winning outcome of the game, wherein the credit meter is activated by the game controller during normal game play to perform the incrementing;

decrementing, in the credit meter, a wager amount provided by the player in response to a losing outcome, wherein the credit meter is activated by the game controller during normal game play to perform the decrementing;

displaying game outcomes to the player on a display under control of the game controller;

communicating a free mode instruction to the game controller on behalf of the player; and locally deactivating the credit meter with the game controller in response to receipt of the free mode instruction by the game controller thereby allowing the player to play the game without entering a wager in the credit meter and inhibiting provision of an award to the player in response to a winning outcome of the game.

* * * * *